United States Patent [19]

Piatt

[11] 4,318,958

[45] Mar. 9, 1982

[54] FLEXIBLE, HIGH CONTRAST, NON-GLARE, POLARIZING FILTER FOR AN ILLUMINATED SWITCH ASSEMBLY

[75] Inventor: David M. Piatt, Woodland Hills, Calif.

[73] Assignee: The United States of America as represented by the Secretary of the Army, Washington, D.C.

[21] Appl. No.: 181,460

[22] Filed: Aug. 25, 1980

Related U.S. Application Data

[63] Continuation of Ser. No. 21,395, Mar. 19, 1979, abandoned.

[51] Int. Cl.[3] .................... B32B 17/06; N01N 9/00
[52] U.S. Cl. .................................. 428/332; 200/1 R; 200/5 R; 200/46; 200/313; 340/365 S; 428/426

[58] Field of Search ................ 200/46, 313, 1 R, 5 R; 340/365 S; 428/215, 332, 426

[56] References Cited

U.S. PATENT DOCUMENTS 3,732,389  5/1973  Kaelin et al. ................... 200/313
3,777,222 12/1973  Harris .............................. 200/46 X
4,251,591  2/1981  Chi ................................... 428/315

Primary Examiner—Thomas J. Herbert, Jr.
Attorney, Agent, or Firm—Nathan Edelberg; Jeremiah G. Murray; Edward Goldberg

[57] ABSTRACT

An optically coated, flexible glass plate cemented to a sheet of polarizing material combine to provide a high contrast, non-glare, polarizing filter that can be used in combination with an illuminated switch assembly such as with conventional membrane switches.

5 Claims, 2 Drawing Figures

U.S. Patent     Mar. 9, 1982     4,318,958
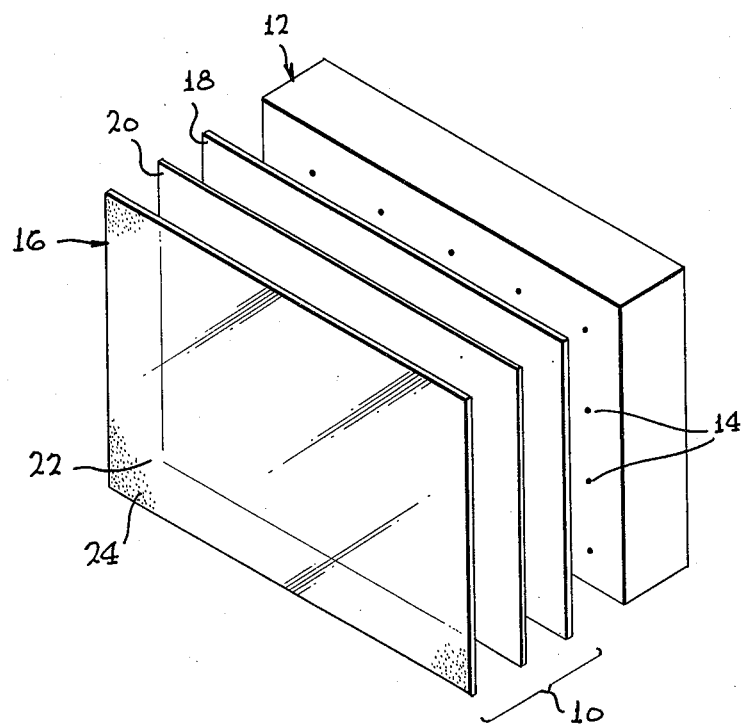
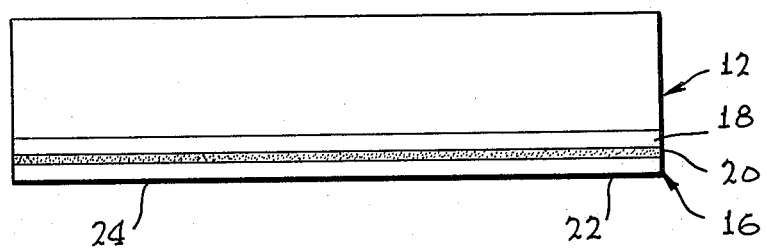

FLEXIBLE, HIGH CONTRAST, NON-GLARE, POLARIZING FILTER FOR AN ILLUMINATED SWITCH ASSEMBLY

BACKGROUND OF THE INVENTION

The Government of the United States of America has rights in this invention pursuant to Contract No. DAAB07-77C-0908 awarded by the U.S. Army Communications, Research and Development Command.

This is a continuation of application Ser. No. 21,395, filed Mar. 19, 1979 and now abandoned.

Illuminated switch assemblies of various types are considered to be well-known in the prior art; included in these are membrane or touch entry switch assemblies. For example, see U.S. Pat. Nos. 3,777,222 and 3,732,389; the latter patent assigned to the same assignee as this invention. These illuminated switch assemblies or arrays project indicia either from a plane behind the switch to the switch panel, or from the plane behind the switch through the switch itself for viewing at the switch panel. However, prior to this invention, viewing the illuminated indicia has been made difficult by the lack of contrast, and by glare. Non-glare or anti-reflective coatings, such as OCLI's high efficiency, anti-reflective coating, (HEA), have not been successfully applied to plastic materials. Filters to reduce or eliminate glare are readily available for cathode ray tubes (CRTs) where such filters are made of glass plates separated by a polarizer; however, it would be impossible to actuate a membrane switch through such a filter.

OBJECTS OF THE INVENTION

Accordingly, it is an object of the invention to provide a new and improved filter for an illuminated switch assembly.

It is an object of the invention to provide a filter for an illuminated membrane switch.

It is an object of the invention to provide a flexible, high contrast, non-glare, and polarizing filter for an illuminated membrane switch.

SUMMARY OF THE INVENTION

Briefly, in accordance with the invention, a filter for a membrane switch having selectively illuminated indicia is provided where a flexible glass sheet has its obverse surface coated with a non-glare coating and its reverse surface bonded to a flexible circular polarizer sheet with a transparent bonding material so that the filter substantially reduces glare and enhances contrast in the illuminated indicia.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

BRIEF DESCRIPTION OF THE DRAWING

FIG. 1 is an exploded perspective of the filter of the invention associated with a schematically shown membrane switch.

FIG. 2. is a side view of the filter and membrane switch of FIG. 1 when assembled, with the thickness of the individual parts exaggerated for purposes of clearer illustration.

DESCRIPTION OF THE INVENTION

Referring to FIGS. 1 and 2, the filter 10 of the invention is assembled with a conventional membrane switch array 12 that has indicia (not shown) that are selectively illuminated, for example, by a light-emitting diode (LED) such as schematically illustrated at 14 by FIGURE 1, when a membrane switch in the switch array is actuated.

The filter 10 consists of a thin sheet of glass 16 which, because of its relative thinness, is flexible so that a selected membrane switch of the array 12 can be actuated without actuating any other membrane switch of the array. The glass sheet is bonded or cemented to a thin flexible circular polarizer sheet 18; for example, such a sheet which is 10 mils thick is manufactured by the Polaroid Corporation. It is contemplated that thinner sheets would be used as they become available. A transparent bonding material 20, such as epoxy cement, joins the reverse surface of glass sheet 16 to the circular polarizer sheet 18.

The obverse surface 22 of the glass sheet 16 is optically coated with a layer 24 of an anti-glare composition, such as high efficiency, anti-reflective coating (HEA) manufactured by the Optical Coating Labs. Inc. (OCLI).

As will be evidenced from the foregoing description, certain aspects of the invention are not limited to the particular details of construction as illustrated, and it is contemplated that other modifications and applications will occur to those skilled in the art. It is therefore, intended that the appended claims shall cover such modifications and applications that do not depart from the true spirit and scope of the invention.

I claim:

1. A filter for a membrane switch array having selectively illuminated indicia, the filter comprising:
   (a) a flexible glass sheet of sufficient thinness to permit touch actuation of a selected individual membrane switch of said array, said sheet having its obverse surface coated with a non-glare coating having properties specifically adapted for use with glass,
   (b) a flexible polarizer sheet of sufficient thinness for said touch actuation, and
   (c) transparent bonding material joining the reverse side of said glass sheet to said polarizer sheet so that the resulting filter when associated with the switch substantially reduces glare and enhances contrast in the illuminated indicia.

2. The filter of claim 1 in which said polarizer is a circuit or polarizer.

3. The filter of claim 1 in which said polarizer has a thickness of up to 10 mils.

4. The filter of claim 1 in which said transparent bonding material is epoxy cement.

5. The filter of claim 1 in which said non-glare coating is a high efficiency, anti-reflective coating for glass having the properties of that known by the trade name HEA.

* * * * *

UNITED STATES PATENT AND TRADEMARK OFFICE
CERTIFICATE OF CORRECTION

PATENT NO. : 4,318,958
DATED : March 9, 1982
INVENTOR(S) : DAVID M. PIATT

It is certified that error appears in the above-identified patent and that said Letters Patent are hereby corrected as shown below:

Claim 2, line 2

Cancel "circuit or" and substitute - circular - .

Signed and Sealed this

Eighteenth Day of May 1982

[SEAL]

Attest:

GERALD J. MOSSINGHOFF

Attesting Officer     Commissioner of Patents and Trademarks